(12) United States Patent
Manabe et al.

(10) Patent No.: US 7,216,078 B2
(45) Date of Patent: May 8, 2007

(54) LEARNING DEVICE, MOBILE COMMUNICATION TERMINAL, INFORMATION RECOGNITION SYSTEM, AND LEARNING METHOD

(75) Inventors: Hiroyuki Manabe, Yokosuka (JP); Akira Hiraiwa, Yokohama (JP); Toshiaki Sugimura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 842 days.

(21) Appl. No.: 10/367,886

(22) Filed: Feb. 19, 2003

(65) Prior Publication Data

US 2003/0182112 A1 Sep. 25, 2003

(30) Foreign Application Priority Data

Feb. 19, 2002 (JP) ............................. 2002-042072
Feb. 14, 2003 (JP) ............................. 2003-037064

(51) Int. Cl.
*G10L 15/06* (2006.01)

(52) U.S. Cl. .................... 704/243; 704/270; 455/441.4

(58) Field of Classification Search ................ 704/243, 704/270; 455/441.4
See application file for complete search history.

(56) References Cited

U.S. PATENT DOCUMENTS 4,096,645 A * 6/1978 Mandl ........................ 434/185
6,006,175 A * 12/1999 Holzrichter ................ 704/208

FOREIGN PATENT DOCUMENTS

EP 1 047 046 A2 10/2000
JP 7-181888 7/1995

OTHER PUBLICATIONS

A. D. C. Chan, et al., "Hidden Markov Model Classification of Myoelectric Signals in Speech", Proceedings of the 23rd Annual EMBS International Conference of the IEEE Engineering in Medicine and Biology Society, vol. 1 of 4, conf. 23, XP-010594764, Oct. 25-28, 2001, pp. 1727-1730.

S. Noboru, et al., IEEE Transactions on Biomedical Engineering, vol. BMB-32, No. 7, pp. 485-490, "A Speech Prosthesis Employing a Speech Synthesizer Vowel Discrimination From Perioral Muscle Activities and Vowel Production", Jul. 1985.

* cited by examiner

*Primary Examiner*—Abul K. Azad
(74) *Attorney, Agent, or Firm*—Oblon, Spivak, McClelland, Maier & Neustadt, P.C.

(57) ABSTRACT

The myo-electric information of the user is transmitted to the data center, learning with a high computation load for generating recognition parameters required for recognizing the utterance content based on the myo-electric information is performed, not by the mobile communication terminal, but by the data center. By this, compared with the case when learning is performed in the mobile communication terminal which has stricter limitations on processing speed and memory than a stationary type computer, efficient learning in a shorter time becomes possible. Since the recognition parameters acquired at the data center are transmitted to the mobile communication terminal, hereafter utterance content recognition can be appropriately performed by the recognition parameters matching the user only by the mobile communication terminal, without the mobile communication terminal transmitting/receiving information with a learning device.

20 Claims, 8 Drawing Sheets

LEARNING DEVICE, MOBILE COMMUNICATION TERMINAL, INFORMATION RECOGNITION SYSTEM, AND LEARNING METHOD

BACKGROUND OF THE INVENTION

1. Field of the Invention

The present invention relates to a mobile communication terminal which recognizes the content of an utterance based on the information on the movement of the articulation organs when the user speaks, a learning device which generates recognition parameters related to the recognition of the content of an utterance, an information recognition system which includes these, and a learning method which is performed in this information recognition system.

2. Related Background Art

An information recognition method where the content of an utterance is recognized based, not on the sound information, but on the information on the movement of the articulation organs, such as myo-electric information around the mouth of an individual who performs utterance action and the image of their lips, has been known. By this method, the content of an utterance can be recognized from the movement of the mouth and lips, even when the speaker does not utter a sound, and as disclosed in Japanese Patent Application Laid-Open No. 7-181888, for example, this method is applied to a device which recognizes the content of an utterance of an individual having no pharynx, who cannot vocalize due to sickness or an accident, by the movement of their lips.

When the content of an utterance is recognized based on such information on the movement of the articulation organs, it is important to learn information on the movement of the articulation organs adaptively for each speaker, so as to support various speaking features of the speaker, generate unique recognition parameters for the speaker, and recognize the content of an utterance based on the recognition parameters for each speaker, and by this, the recognition accuracy of the content of an utterance can be improved.

SUMMARY OF THE INVENTION

Such an information recognition method, which does not require sound information, is not influenced by ambient noise, and can be used as means of recognizing the content of an utterance in a location where ambient noise is high, such as outdoors, and where silence is required, such as in an office and library, since silent utterance action with moving the mouth and tongue is sufficient, so it is possible to apply this information recognition method to a mobile communication terminal, represented by a portable telephone.

However, large memory and high computing capability are required for learning on the recognition of the content of an utterance based on the information on movement of the articulation organs, and it is difficult to execute such learning by a mobile communication terminal, such as portable telephone, where processing capability and memory are limited, and recognizing the content of an utterance based on the information on the movement of articulation organs is difficult with a mobile communication terminal.

With the foregoing in view, it is an object of the present invention to provide a learning device, mobile communication terminal, information recognition system, and learning method which allows the recognition of the content of an utterance based on the information on the movement of the articulation organs in a mobile communication terminal.

A learning device according to the present invention is a learning device constituting an information recognition system whereby, along with a mobile communication terminal inter-communicable via a network, the content of an utterance is recognized based on information on the movement of articulation organs when a user of the mobile communication terminal performs utterance action, comprising articulation organ information reception means for receiving information on the movement of the articulation organs which is transmitted from the mobile communication terminal, teacher data acquisition means for acquiring teacher data corresponding to the utterance action of the user, learning means for performing learning on recognition of the content of an utterance concerning the utterance action and generating recognition parameters based on the information on the movement of the articulation organs and the teacher data, and recognition parameter transmission means for transmitting the recognition parameters to the mobile communication terminal.

A mobile communication terminal according to the present invention is a mobile communication terminal whereby, along with a learning device inter-communicable via a network, the content of an utterance is recognized based on information on the movement of the articulation organs of the user when the user performs an utterance action, comprising articulation organ information acquisition means for acquiring information on the movement of the articulation organs of the user when the user performs utterance action, articulation organ information transmission means for transmitting the information on the movement of the articulation organs to the learning device, recognition parameter reception means for receiving recognition parameters on recognizing the content of an utterance which is transmitted from the learning device, and information recognition means for recognizing the content of an utterance on the utterance action based on the information on the movement of the articulation organs and the recognition parameters.

An information recognition system according to the present invention is an information recognition system for recognizing the content of the utterance based on information on the movement of the articulation organs of a user of a mobile communication terminal when the user performs utterance action comprising a mobile communication terminal and a learning device which can communicate with the mobile communication terminal via a network, wherein the mobile communication terminal further comprises articulation organ information acquisition means for acquiring information on the movement of the articulation organs or the user when the user performs an utterance action, articulation organ information transmission means for transmitting the information on the movement of the articulation organs to the learning device, recognition parameter reception means for receiving recognition parameters on recognizing the content of an utterance which are transmitted from the learning device, and information recognition means for recognizing the content of an utterance concerning the utterance action based on the information on the movement of the articulation organs and the recognition parameters, and the learning device further comprises articulation organ information reception means for receiving the information on the movement of the articulation organs which is transmitted from the mobile communication terminal, teacher data acquisition means for acquiring teacher data corresponding to the utterance action of the user, learning means for performing learning on recognition of the content of the utterance concerning the utterance action and generating recognition parameters based on the information on the movement of the articulation organs and the teacher data, and recognition parameter transmission means for transmitting the recognition parameters to the mobile communication terminal.

A first learning method according to the present invention is a learning method in an information recognition system for recognizing the content of an utterance based on the information on the movement of articulation organs of a user of the mobile communication terminal when the user performs utterance action using of the mobile communication terminal and a learning device which can communicate with the mobile communication terminal via a network, comprising: an articulation organ information acquisition step where the mobile communication terminal acquires information on the movement of the articulation organs of the user when the user performs an utterance action; an articulation organ information transmission step where the mobile communication terminal transmits the information on the movement of the articulation organs to the learning device; an articulation organ information reception step where the learning device receives the information on the movement of the articulation organs transmitted from the mobile communication terminal; a teacher data acquisition step where the learning device acquires teacher data corresponding to the utterance action of the user; a learning step where the learning device performs learning on the recognition of the content of the utterance concerning the utterance action and generating the recognition parameters based on the information on the movement of the articulation organs and the teacher data; a recognition parameter transmission step where the learning device transmits the recognition parameters to the mobile communication terminal; and a recognition parameter reception step where the mobile communication terminal receives the recognition parameters which are transmitted from the learning device.

A second learning method according to the present invention is a learning method in a learning device constituting an information recognition system for recognizing the content of an utterance based on information on the movement of articulation organs when a user of a mobile communication terminal performs utterance action, comprising: an articulation organ information reception step for receiving information on the movement of articulation organs which are transmitted from the mobile communication terminal; a teacher data acquisition step for acquiring teacher data corresponding to the utterance action of the user; a learning step for performing learning on the recognition of the content of an utterance concerning the utterance action and generating recognition parameters based on the information on the movement of the articulation organs and the teacher data; and a recognition parameter transmission step for transmitting the recognition parameters to the mobile communication terminal.

According to the learning device, mobile communication terminal, information recognition system and learning methods of the present invention, information on the movement of the articulation organs of the user is transmitted to the learning device, and executes the learning which requires a high computation load for generating the necessary recognition parameters for recognizing the content of an utterance based on the information on the movement of the articulation organs of the user is performed not by the mobile communication terminal but by the learning device. Therefore compared with the case when learning is executed by a mobile communication terminal, which has stricter limitations on processing speed and memory than a stationary type computer, efficient learning can be implemented in a short time. The recognition parameters which the user adapted by such learning are transmitted to the mobile communication terminal, and thereafter the recognition of the content of an utterance can be suitably implemented at a high recognition rate only by a mobile communication terminal, without transmitting/receiving information with the learning device.

It is preferable that the above mentioned learning device further comprises a recognition parameter data base for storing the recognition parameters generated by the learning means for each user, wherein the learning means refers to the recognition parameters generated in the past for the user when the recognition parameters are generated by the learning.

In the above mentioned information recognition system, it is preferable that the learning device further comprises a recognition parameter database for storing the recognition parameters generated by the learning means for each user, and the learning means refers to the recognition parameters generated for the user in the past when the recognition parameters are generated by the learning.

In the above mentioned first learning method, it is preferable that the learning device further comprises a recognition parameter storing step for storing the recognition parameters generated by the learning step into a recognition parameter data base for each user, and the learning step refers to the recognition parameters generated for the user in the past when the recognition parameters are generated by the learning.

It is preferable that of the above mentioned second learning method further comprises a recognition parameters storing step for storing the recognition parameters generated by the learning step for each user, wherein in the learning step, the recognition parameters generated for the user in the past are referred to when recognition parameters are generated by the learning.

According to the learning device, information recognition system and learning methods, when the recognition parameters acquired for each user during learning in the past are improved so as to improve the recognition rate in the learning in the learning device, it is unnecessary to transmit the recognition parameters in the past from each mobile communication terminal to the learning device, and the recognition parameters can be sequentially improved easily.

In the above mentioned learning device, it is preferable that the teacher data acquisition means comprises utterance pattern generation means for generating utterance patterns for the user to speak as teacher data, and the recognition parameters transmission means transmits the utterance patterns to the mobile communication terminal.

In the above mentioned mobile communication terminal, it is preferable that the recognition parameter reception means further receives utterance patterns which are transmitted from the learning device, and the mobile communication terminal further comprises utterance pattern presentation means for presenting the utterance patterns to the user.

In the above mentioned information recognition system, it is preferable that the teacher data acquisition means comprises utterance pattern generation means for generating utterance patterns for the user to speak as the teacher data, the recognition parameter transmission means of the learning device further transmits the utterance patterns to the mobile communication terminal, the recognition parameter reception means of the mobile communication terminal further receives the utterance patterns which are transmitted from the learning device, and the mobile communication terminal further comprises utterance pattern presentation means for presenting the utterance patterns to the user.

In the above mentioned first learning method, it is preferable that the teacher data acquisition step comprises an utterance pattern generation step for generating utterance patterns for the user to speak as teacher data, and the recognition parameter transmission step further transmits the utterance patterns to the mobile communication terminal, the recognition parameter reception step further receives the utterance patterns which are transmitted from the learning device, and the mobile communication terminal further comprises an utterance pattern presentation step for presenting the utterance patterns to the user.

In the above mentioned second learning method, it is preferable that the teacher data acquisition step comprises an utterance pattern generation step for generating utterance patterns for the user to speak as teacher data, and an utterance pattern transmission step for transmitting the utterance patterns to the mobile communication terminal.

According to the learning device, mobile communication terminal, information recognition system and learning methods, utterance patterns suitable for learning are generated at the learning device side and are transmitted to the mobile communication terminal, and the user can speak based on these utterance patterns at the mobile communication terminal, and at the learning device side, learning is executed using the generated utterance patterns as teacher data, so learning on the recognition of the content of an utterance can be performed efficiently. Also utterance patterns suitable for learning are generated at the learning device side, so the load on computation and memory of the mobile communication terminal is not increased, even if such utterance patterns are generated.

It is preferable that the above mentioned learning device further comprises a personal information data base where personal information on the user is stored corresponding to the user, wherein the utterance pattern generation means generates utterance patterns based on the personal information on the user.

In the above mentioned information recognition system, it is preferable that the learning device further comprises a personal information data base where personal information on the user is stored corresponding to the user, and the utterance pattern generation means generates the utterance patterns based on the personal information on the user.

In the above mentioned first learning method, it is preferable that the learning device further comprises a personal information storing step for storing personal information on the user into a personal information data base corresponding to the user, and the utterance pattern generation step generates utterance patterns based on the personal information on the user It is preferable that the above second mentioned learning method further comprises a personal information storing step for storing the personal information on the user corresponding to the user, and the utterance pattern generation step generates utterance patterns based on the is personal information on the user.

According to these learning devices, information recognition systems and learning methods, utterance patterns suitable for each user can be generated based on the personal information of each user, including age, gender and dialect, so recognition parameters suitable for the user can be more efficiently generated, and the recognition rate in the mobile communication terminal can be easily increased, In the above mentioned learning device, it is preferable that the articulation organ information reception means further receives information on sound at the utterance action which is transmitted from the mobile communication terminal, and the teacher data acquisition means comprises sound information recognition means for performing voice recognition based on the information on sound and acquiring teacher data corresponding to the utterance action.

In the above mentioned mobile communication terminal, it is preferable that the information recognition system further comprises sound acquisition means for acquiring the information on sound which is generated when the utterance action is performed, and the articulation organ information transmission means further transmits the information on sound to the learning device.

In the above mentioned information recognition system, it is preferable that the mobile communication terminal further comprises sound acquisition means for acquiring information on sound which is generated when the utterance action is performed, the articulation organ information transmission means of the mobile communication terminal further transmits the information on sound to the learning device, the articulation organ information reception means of the learning device further receives the information on sound which is transmitted from the mobile communication terminal, and the teacher data acquisition means comprises sound information recognition means for performing voice recognition based on the information on sound and acquiring teacher data corresponding to the utterance action.

In the above mentioned first learning method, it is preferable that the mobile communication terminal further comprises a sound acquisition step for acquiring information on sound which is generated when the utterance action is performed, the articulation organ information transmission step further transmits the information on sound to the learning device, the articulation organ information reception step further receives the information on sound which is transmitted from the mobile communication terminal, and the teacher data acquisition step comprises a sound information recognition step for performing voice recognition based on the information on sound and acquiring teacher data corresponding to the utterance action.

In the above mentioned second learning method, it is preferable that the information on sound at the utterance action, which is transmitted from the mobile communication terminal, is further received in the articulation organ information reception step, and in the teacher data acquisition step voice recognition is performed based on the information on sound and teacher data corresponding to the utterance action is acquired.

According to these learning devices, mobile communication terminals, information recognition systems and learning methods, the information on sound which is generated when the user performs utterance action is transmitted to the learning device, and teacher data is acquired in the learning device based on this information on sound, so recognition parameters on recognizing the content of an utterance is acquired while users are having a normal conversation, without causing a burden on users, such as having speakers speak with a specified utterance pattern.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Embodiments of the information recognition system (voice recognition system) according to the present invention will now be described with reference to the accompanying drawings.

Figure 1:
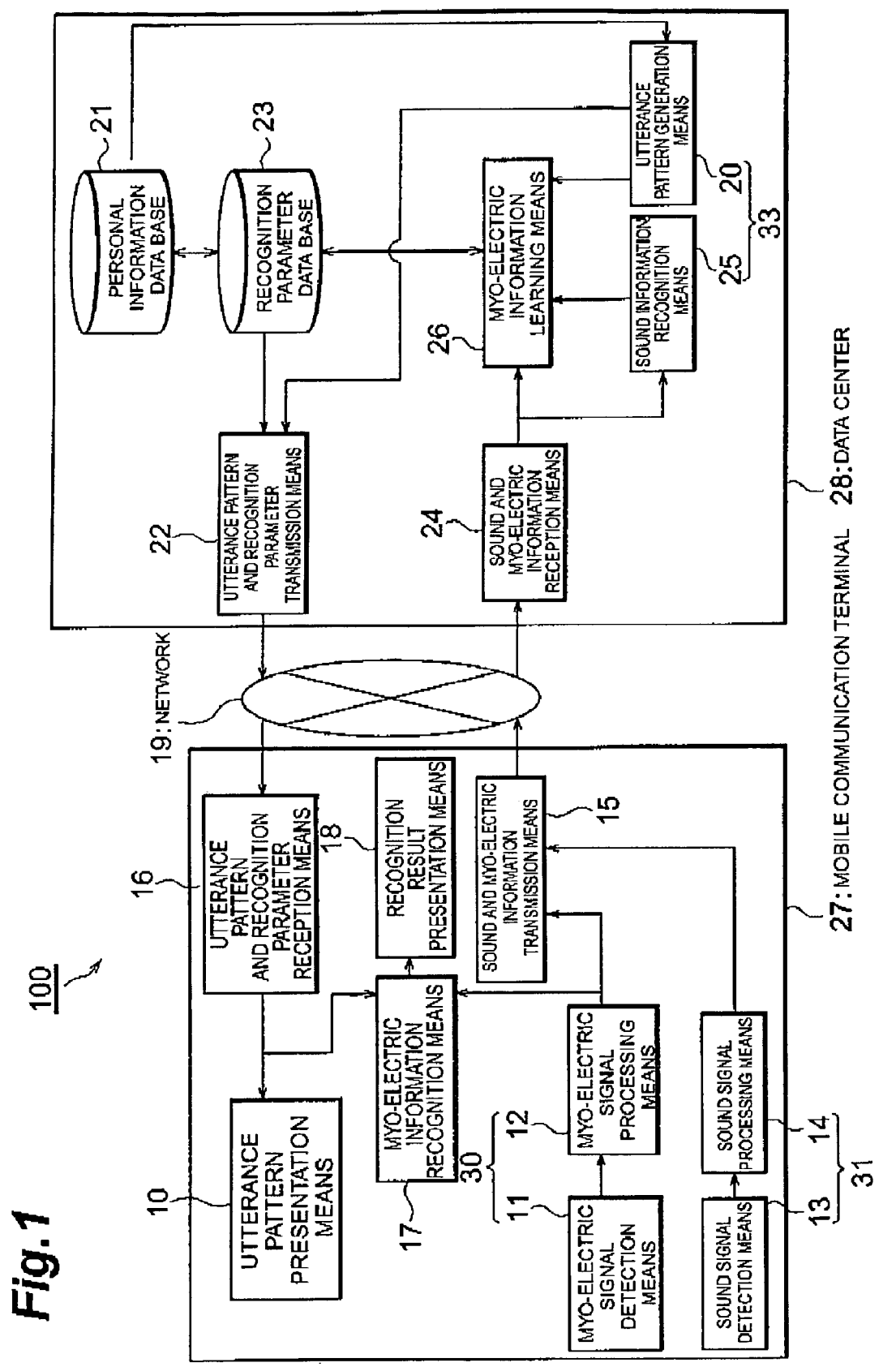
FIG. 1 is a block diagram depicting an information recognition system according to the present embodiment.

FIG. 1 is a block diagram depicting the configuration of the information recognition system according to the present embodiment. The information recognition system 100 of the present embodiment is comprised of a mobile communication terminal 27 for recognizing utterance content based on predetermined recognition parameters and a data center 28 as a computer server which generates recognition parameters matching the user who uses the mobile communication terminal 27 by learning, and these are inter-connected via a cable or wireless network 19.

The mobile communication terminal 27 is comprised of myo-electric information acquisition means (articulation organ information acquisition means) 30 which is further comprised of myo-electric signal detection means 11 and myo-electric signal processing means 12, sound information acquisition means 31 which is further comprised of sound signal detection means 13 and sound signal processing means 14, sound and myo-electric information transmission means (articulation organ information transmission means) 15 for transmitting the information to the data center 28, utterance pattern and recognition parameter reception means (recognition parameter reception means) 16 for receiving the information from the data center 28, myo-electric information recognition means (information recognition means) 17 for recognizing utterance content, recognition result presentation means 18 for presenting the recognition result, and utterance pattern presentation means 10 for presenting utterance patterns to the user, and there is also a function for communicating with another mobile communication terminal, such as a portable telephone (not illustrated).

The sound signal detection means 13 detects the sound signal which is generated when the user speaks, and the sound signal processing means 14 performs spectrum analysis and Kepstrum analysis of the sound signal detected by the sound signal detection means 13, and acquires the sound information.

The myo-electric signal detection means 11 detects the myo-electric signal of the muscle around the mouth (articulation organs), and the myo-electric signal processing means 12 amplifies the acquired myo-electric signal which is sampled out by a time window, and performs power calculation and spectrum analysis to acquire myo-electric information.

Here the user performs utterance action by using such articulation organs as lips, chin, teeth, tongue, nostrils and soft palate. In these articulation organs, the articulation operation is performed mainly by moving the muscle around the mouth, so information on the movement of the articulation organs can be appropriately acquired by acquiring the myo-electric signals of the muscle around the mouth of the user.

Figure 2:
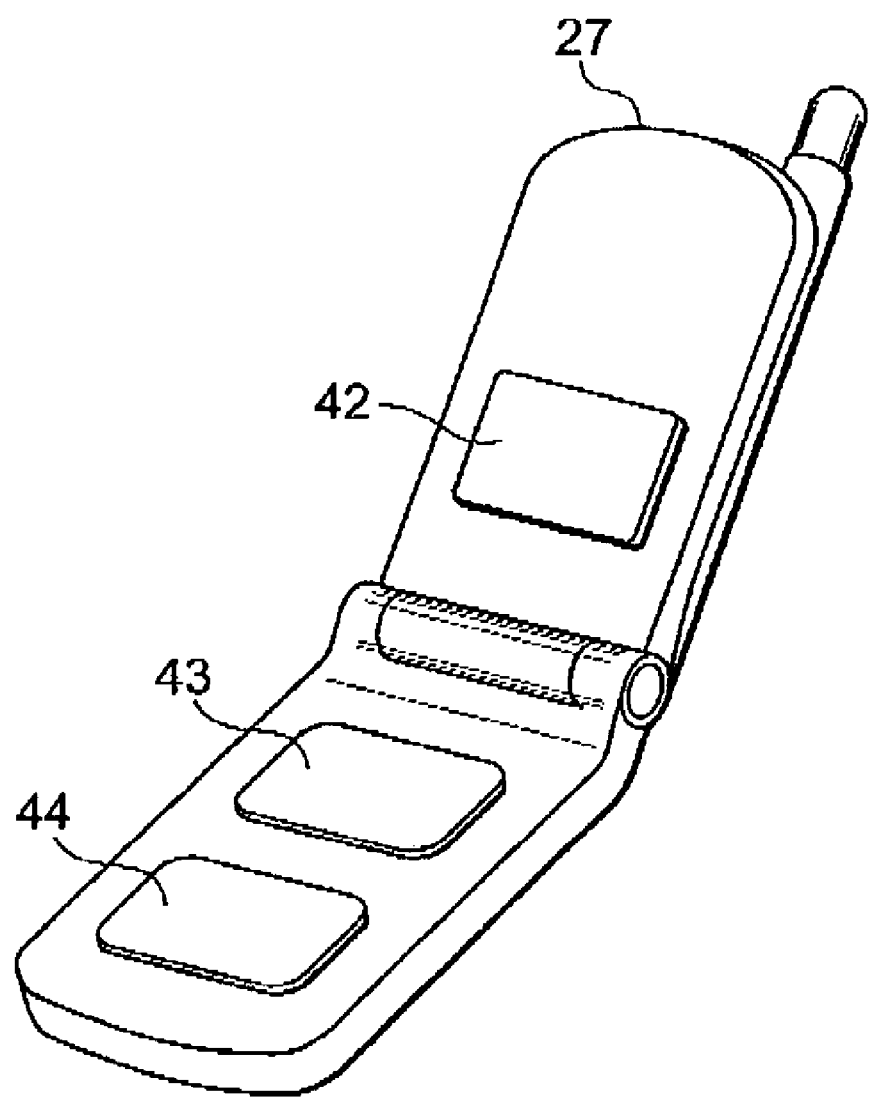
FIG. 2 is a schematic diagram depicting an example of the myo-electric signal detection means of the mobile communication terminal in FIG. 1.
Figure 3:
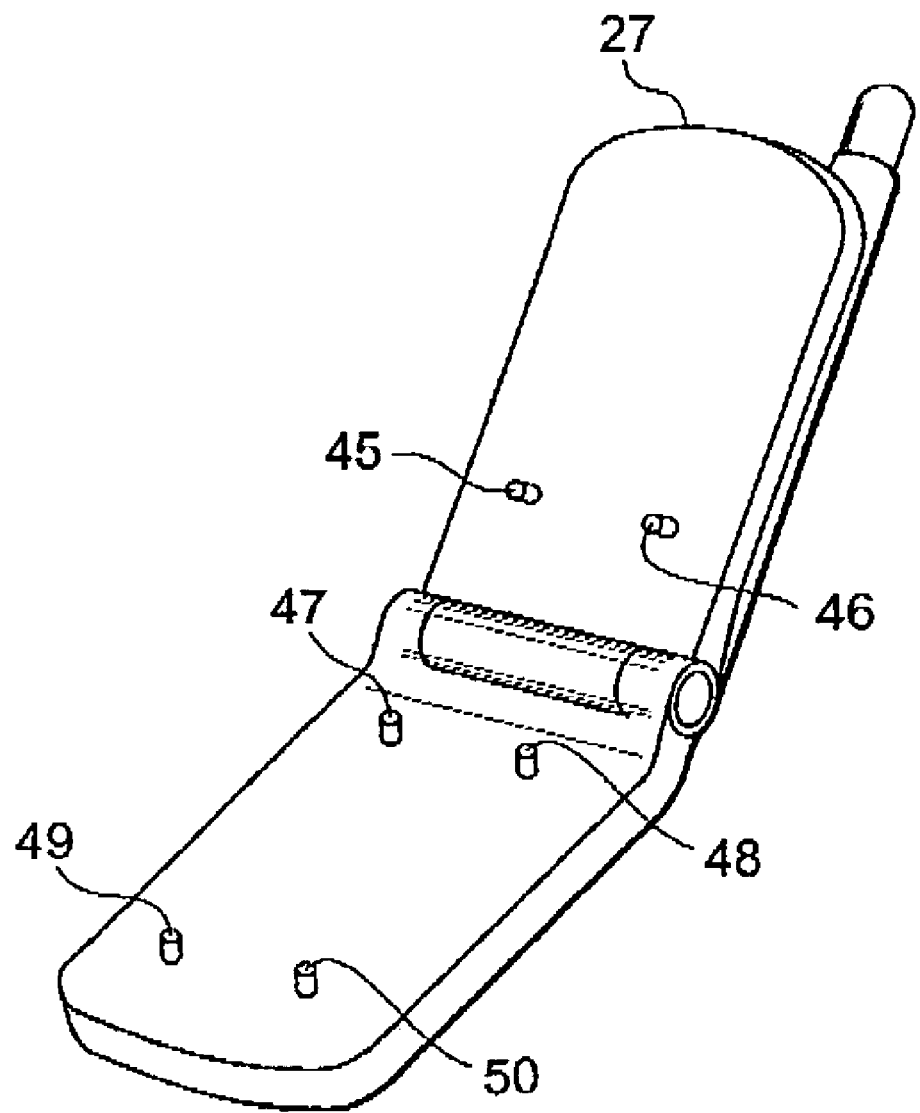
FIG. 3 is a schematic diagram depicting another example of the myo-electric signal detection means of the mobile communication terminal in FIG. 1.

When the present invention is applied to a folding mobile communication terminal, for example, plate type electrodes 42, 43 and 44 can be installed on a surface, to which the facial skin of the user contacts, as the myo-electric signal detection means 11, as shown in FIG. 2, or needle type electrodes 45, 46, 47, 48, 49 and 50 can be installed at locations where the skin contacts, as shown in FIG. 3. To accurately recognize the content of an utterance from the myo-electric information, it is preferable to detect myo-electric signals for a plurality of channels.

The sound and myo-electric information transmission means 15 transmits the myo-electric information from the myo-electric signal processing means 12, and sound information from the sound signal processing means 14, to the data center 28 via the network 19.

The utterance pattern and recognition parameter reception means 16 receives the recognition parameters, which are required to recognize utterance content from the myo-electric information which is transmitted from the data center 28 and the information on the utterance pattern for the user to speak, via the network 19, and the utterance pattern presentation means 10 presents the received utterance pattern to the user by a display and speaker.

The myo-electric information recognition means 17 pattern and recognition parameter reception means 16 and the myo-electric information from the myo-electric signal processing means 12, and the recognition result presentation means 18 transmits the recognition result to the user by a display and speaker, or to another mobile communication terminal via a communication network.

Various methods can be used for the utterance content recognition algorithm of the myo-electric information recognition means 17, and for example as IEEE Transactions on Biomedical. Engineering, Vol. 32, No. 7, 1985 pp. 485–490 (Noboru Sugie et al, "A speech employing speech synthesizer vowel discrimination from perioral muscle activities and vowel production") shows, an algorithm for passing the myo-electric signal through a band pass filter, and counting the number of times the threshold is crossed to identify five vowels (a, i, u, e, o), may be used, or as stated in Japanese Patent Laid-Open No. 7-181888, an algorithm for processing myo-electric information on the muscle around the mouth by a neural network, and detecting not only vowels but consonants as well, may be used, or such an algorithm as the Hidden Markov model may be used.

The data center 28, on the other hand, is comprised of the sound and myo-electric information reception means (articulation organ information reception means) 24 for receiving information from the mobile communication terminal 27 via the network 19, utterance pattern and recognition parameter transmission means (recognition parameter transmission means) 22 for transmitting information to the mobile communication terminal 27 via the network 19, the teacher data acquisition means 33 which is further comprised of sound information recognition means 25 and utterance pattern generation means 20, myo-electric information learning means (learning means) 26 for generating recognition parameters, personal information database 21 for storing various information, and recognition parameter data base 23.

The sound and myo-electric information reception means 24 receives the myo-electric information and sound information which are transmitted from the mobile communication terminal 27 via the network 19.

Personal information, including the gender, age and dialect to be used is stored in the personal information data base 21 according to each user who uses the mobile communication terminal 27.

The utterance pattern generation means 20 generates an utterance pattern suitable for the learning of each user as teacher data based on the personal information stored in the personal information data base 21, and transmits this utterance pattern to the utterance pattern and recognition parameter transmission means 22. Specifically, based on the gender, age, dialect, etc. of the user, words and sentences which this user tends to use the most and the pattern at the end of the sentence which characterizes the utterance of the respective user, for example, are output. If learning has been executed for this user in the past, the utterance pattern suitable for further improving the recognition rate of this user, such as an utterance pattern of a word for which the recognition rate was poor, is generated based on the number of times of learning for this user and the recognition rate data stored in the recognition parameter data base 23 (described later).

The sound information recognition means 25 performs voice recognition based on the sound information received by the sound and myo-electric information reception means 24, in order to acquire voice content information as teacher data corresponding to the utterance action of the user. Here, the voice recognition method in the sound information recognition means 25 is not especially limited, and, for example, the Hidden Markov model based on a spectrum envelope and DP matching method, for example, can be used.

The myo-electric information learning means 26 acquires the myo-electric information received by the sound and myo-electric information reception means 24, acquires the voice content information acquired by the sound information recognition means 25 or the utterance pattern generated by the utterance pattern generation means 20 as teacher data corresponding to the utterance action of the user, executes learning on the recognition of the utterance content by the myo-electric information, and generates the recognition parameters for recognizing the utterance content.

Specifically, it is sufficient to perform learning corresponding to the recognition algorithm of the utterance content to be used by the myo-electric information recognition means 17 of the mobile communication terminal 27, and, for example, when a neural network is used in the myo-electric information recognition means 17, a back propagation method is applied to the neural network.

In the recognition parameter data base 23, recognition parameters generated by learning in the myo-electric information learning means 26, the learning status, such as the number of times of learning, recognition rate with this recognition parameter, and voice content information recognized by the sound information recognition means 25, for example, are stored for each user. The recognition parameter data base 23 is connected with the personal information data base 21, so that such data as the number of times of learning for each user can be referred to for each user.

The utterance pattern and recognition parameter transmission means 22 transmits the recognition parameters for each user stored in the recognition parameter data base 23 and the utterance patterns generated by the utterance pattern generation means 20, to the mobile communication terminal 27 of the user via the network 19. If necessary, the content of the recognition parameter data base 23 and the personal information data base 21 can be transmitted to the mobile communication terminal 27.

Now operation of the information recognition system 100 comprising the above mentioned mobile communication terminal 27 and the data center 28 will be described, and also the learning method in the information recognition system 100 according to the present embodiment will be described.

Figure 4:
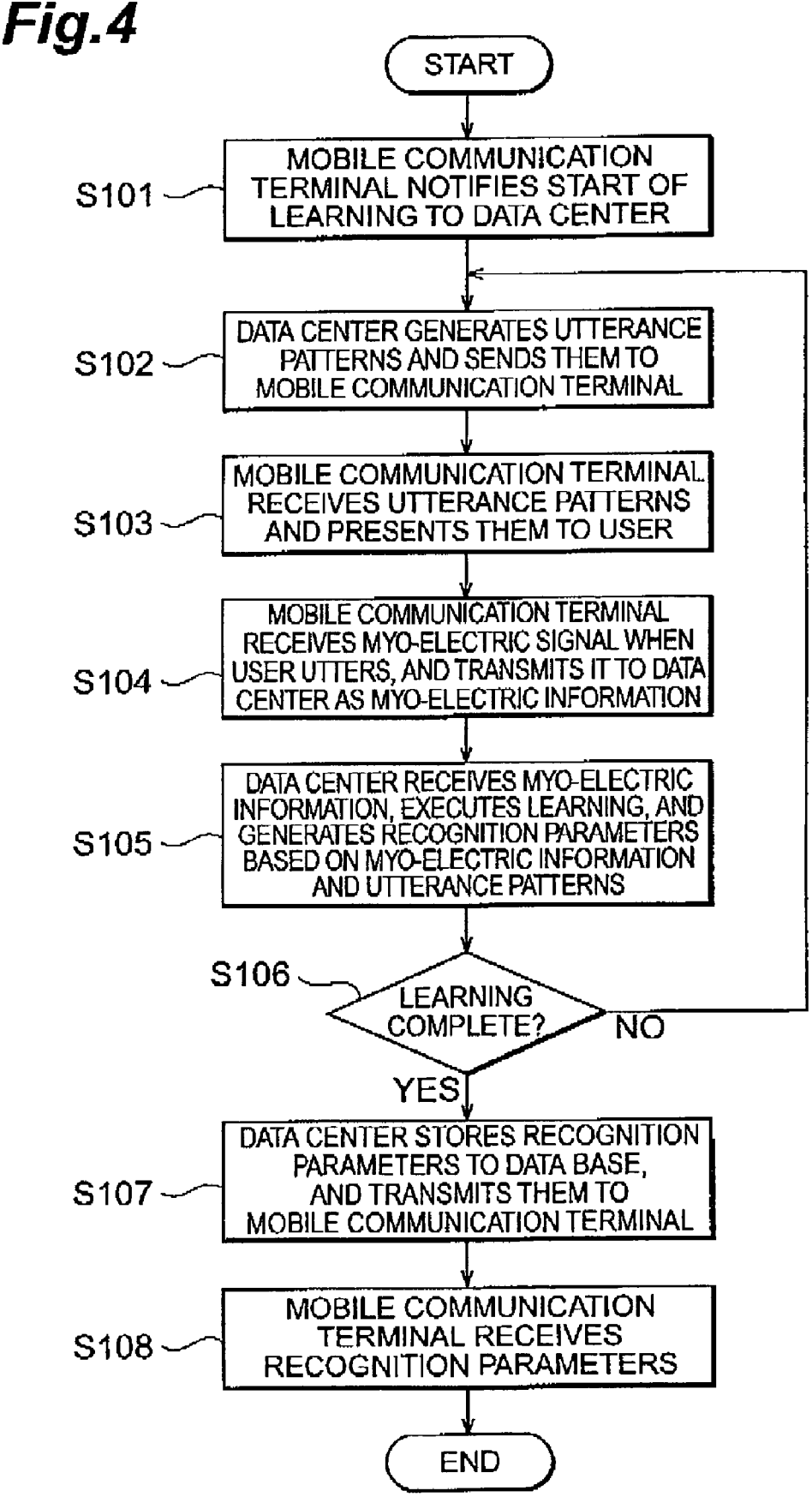
FIG. 4 is a flow chart depicting a learning method based on a first procedure.
Figure 5:
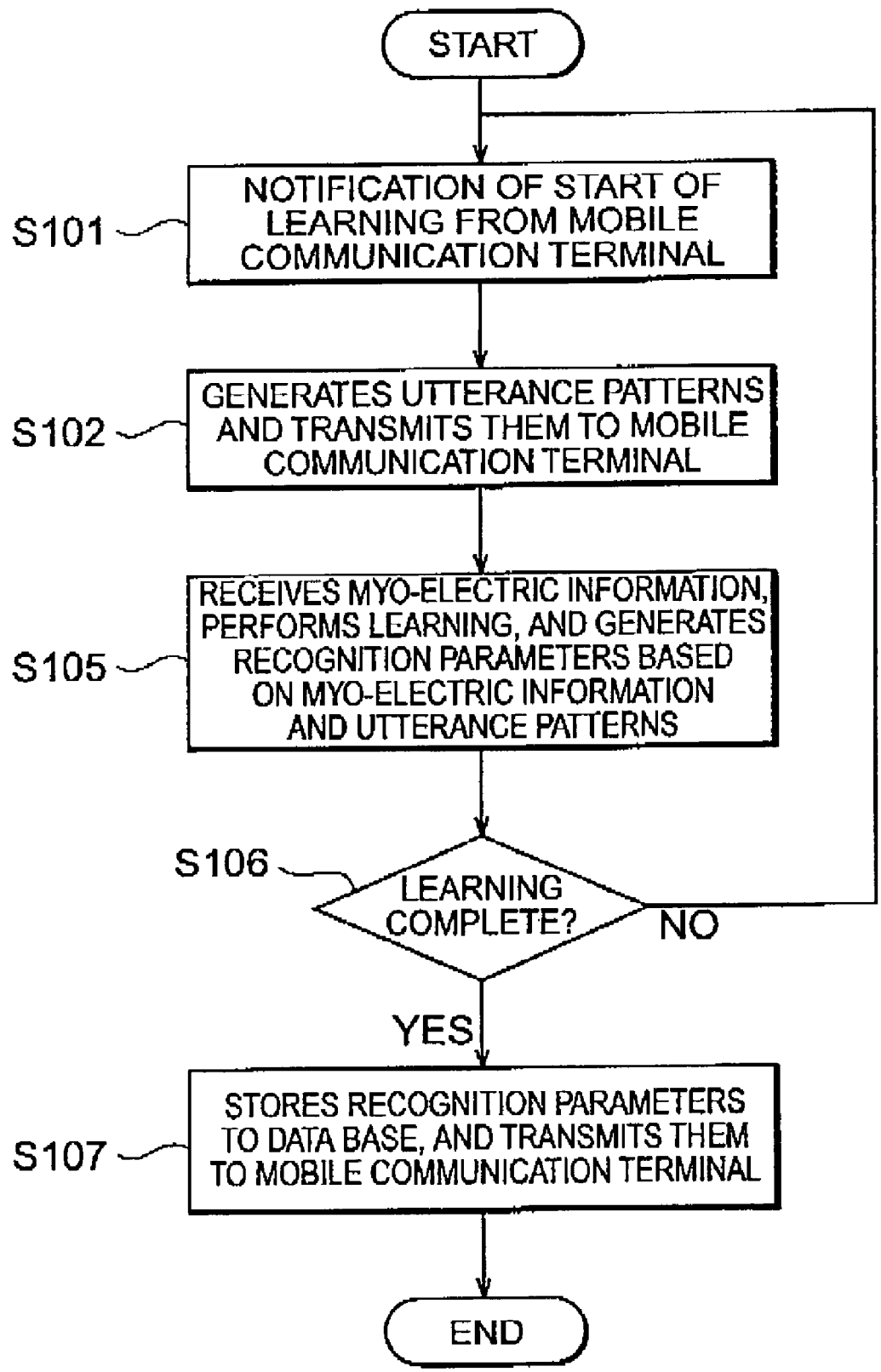
FIG. 5 is a flow chart depicting the steps performed at the data center side extracted from the learning method in FIG. 4.

At first, a procedure, when a user having the mobile communication terminal 27 executes learning by utterance action with or without voice, will be described as a first procedure. FIG. 5 is a flow chart depicting the steps performed by the data center 28 extracted from FIG. 4.

When the user operates a predetermined button to start the learning of the recognition parameters in the mobile communication terminal 27 according to the first procedure, the mobile communication terminal 27 notifies the data center 28 to start learning of the recognition parameters according to the first procedure (step S101).

Then the data center 28, to which the start of learning is notified, generates an utterance pattern suitable for the recognition of the utterance content based on the information on this user stored in the personal information data base 21, and transmits this utterance pattern to the mobile communication terminal 27 (step S102). Here, if the information on this user has not been registered in the personal information data base 21, an utterance pattern, which seems suitable for any speaker, is generated. If learning has been executed on this user in the past, the utterance data suitable for further improvement of the recognition rate of this user is created based on the number of times of learning of this user and recognition rate data stared in the recognition parameter data base 23.

The mobile communication terminal 27 receives the utterance pattern from the data center 28, and presents the utterance pattern to the user (step S103). And the user performs utterance action with or without voice according to the presented utterance pattern.

Then the mobile communication terminal 27 detects the myo-electric signal at the utterance action of the user, generates myo-electric information by performing predetermined processing to this myo-electric signal, and transmits the myo-electric information to the data center 28 (step S104).

The data center 28 receives the myo-electric information, executes learning on the recognition of utterance content by the myo-electric information learning means 26 based on this myo-electric information and the utterance pattern as teacher data corresponding to this myo-electric information, and generates recognition parameters (step S105). When the user has performed learning in the past, the data center 28 reads the recognition parameters in the past of this user from the recognition parameter data base 23, and generates new recognition parameters so as to improve the recognition parameters.

And if learning does not converge or recognition parameters sufficient to recognize utterance content are not generated in step S106, processing returns to step S102 to generate a new utterance pattern, and learning is performed based on this.

If sufficient recognition parameters are generated, on the other hand, processing advances to step S107 to store the acquired recognition parameters into the recognition parameter data base 23 along with such data as the number of times of learning of this user and the recognition rate of the recognition parameters, and transmits the recognition parameters to the mobile communication terminal 27.

And the mobile communication terminal 27 receives these recognition parameters (step S108). Hereafter, the mobile communication terminal 27 can recognize an utterance content locally at a high recognition rate by the myo-electric information recognition means 17 based on the recognition parameters matching this user and the myo-electric information of the user, and the recognized voice content information (language information) is output to a screen or speaker, and is transmitted to another mobile communication terminal via the network 19.

In this way, according to the present invention, the myo-electric information, when the user performs an utterance action, is transmitted to the data center 28, and learning with a high computation load, for generating a recognition parameters required for recognizing the utterance content based on the myo-electric information, is performed not by the mobile communication terminal 27 but by the data center 28. By this, compared with the case when learning for recognizing utterance content is executed by a mobile communication terminal 27 which has more of a limit in processing speed and memory than a stationary type computer, efficient learning in a shorter time becomes possible. The recognition parameters matching the user acquired in this way are transmitted to the mobile communication terminal 27, and hereafter, utterance content can be recognized using the recognition parameters at a high recognition rate only by the mobile communication terminal 27, without the mobile communication terminal 27 transmitting/receiving information with the data center 28.

The recognition parameters are stored for each user in the data center 28, and when the recognition parameters acquired at learning in the past for each user are improved in the learning at the data center 28, it is unnecessary to transmit the recognition parameters in the past of this user from each mobile communication terminal 27 to the data center 28, which makes sequential improvement of the recognition parameters easy, and the recognition rate in the mobile communication terminal 27 can be easily improved.

Also utterance patterns suitable for learning are generated at the data center 28 side, are sent to the mobile communication terminal 27, and are presented to the user, so the user can speak based on utterance patterns suitable for this learning at the mobile communication terminal 27, and learning is executed at the data center 28 side based on the myo-electric information concerning this utterance and utterance patterns as teacher data, so a more efficient learning becomes possible and a recognition rate of the recognition of the utterance content at the mobile communication terminal 27 can be further improved. Also utterance patterns suitable for learning of each user are generated at the data center 28 side, so the generation of such utterance patterns do not increase the computation and memory load of the mobile communication terminal 27.

Personal information for each user is stored in the data center 28, so when utterance patterns are generated, utterance patterns suitable for each user are generated based on the personal information of each user, including age, gender and dialect, and learning can be executed more efficiently. Also since the personal information data is stored in the data center 28, it is unnecessary to transmit personal information from the mobile communication terminal 27 to the data center 28 when personal information is referred to during learning.

Figure 6:
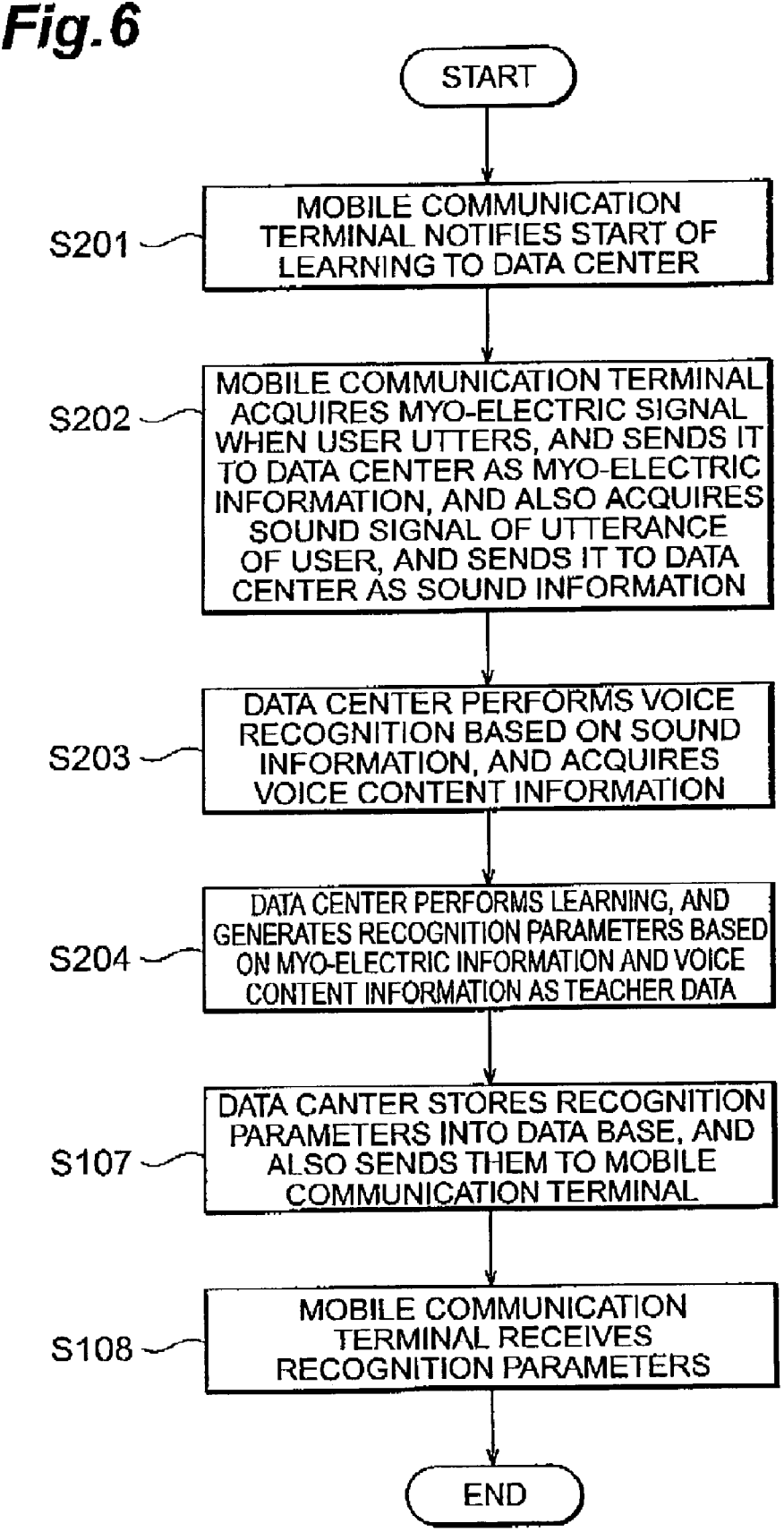
FIG. 6 is a flow chart depicting the learning method based on a second procedure.
Figure 7:
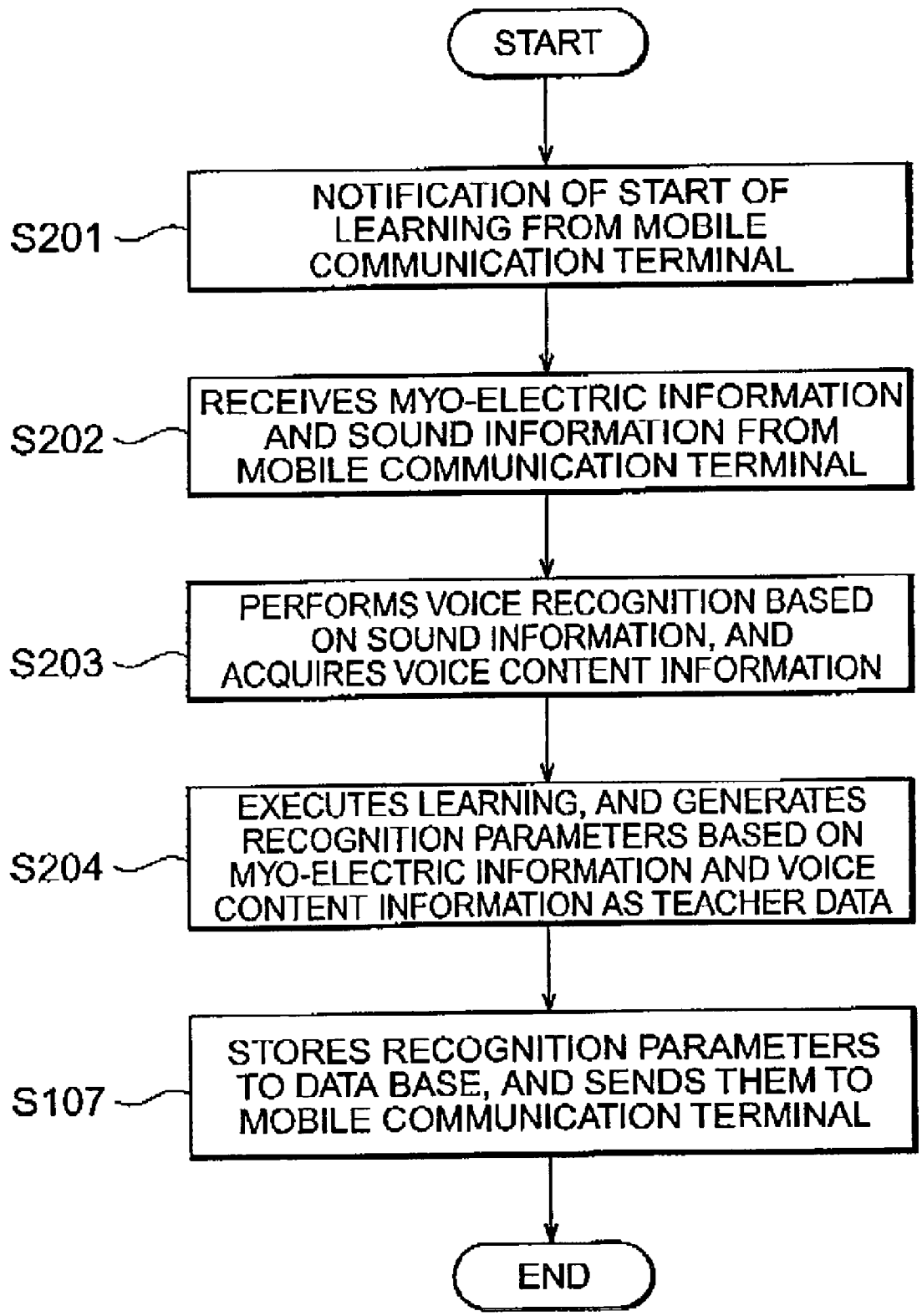
FIG. 7 is a flow chart depicting the steps performed at the data center side extracted from the learning method in FIG. 6.

Now as a second procedure, a procedure to perform learning based on an arbitrary utterance action of a user with voice will be described with reference to FIG. 6 and FIG. 7. FIG. 7 shows the steps performed by the data center 28 extracted from FIG. 6.

At first, the user performs a predetermined button operation to start learning of the recognition parameter by the second procedure in the mobile communication terminal 27, then the mobile communication terminal 27 notifies the data center 28 of the start of learning of the recognition parameters by the second procedure (step S201). And the user performs "voice talk" in an ordinary way, that is without restricting their utterance patterns, with another mobile communication terminal using the mobile communication terminal 27.

At this time, the mobile communication terminal 27 acquires a myo-electric signal at the voice talk of the user, and transmits it to the data center 28 as myo-electric information in the same way as the first procedure, and also detects the sound signal at the voice talk of the user, performs a predetermined processing on this sound signal to generate sound information, and sends the sound information to the data center 28 (step S202).

The data center 28 receives the myo-electric information and sound information from the mobile communication terminal 27, performs voice recognition based on the sound information, and acquires voice content information (language information) when the user performs voice talk (step S203).

The data center 28 performs learning on the recognition of the content of an utterance from myo-electric information, and generates a recognition parameters based on the myo-electric information and voice content information as teacher data corresponding to the myo-electric information (step S204). When the user executed learning in the past, recognition parameters of the user in the past are read from the recognition parameter data base 23, and new recognition parameters are generated so as to improve the recognition parameters in the same way as the first procedure.

When voice talk with the mobile communication terminal 27 ends, the data center 28 stores the generated recognition parameters and voice content information into the recognition parameter data base 23, and transmits the recognition parameters to the mobile communication terminal 27 (step S107), and the mobile communication terminal 27 receives the recognition parameters (step S108).

And hereafter, the mobile communication terminal 27 can locally recognize the utterance content, based on the recognition parameters matching the user and myo-electric information, as described above.

In the present embodiment, the sound information on the utterance action of the user is transmitted to the data center 28, and teacher data is acquired based on this sound information at the data center 28, so a recognition parameter on the recognition of the utterance content at the mobile communication terminal 27 side can be acquired while performing normal conversation without causing a burden to the user, such as having a user speak in a specified utterance pattern.

Figure 8:
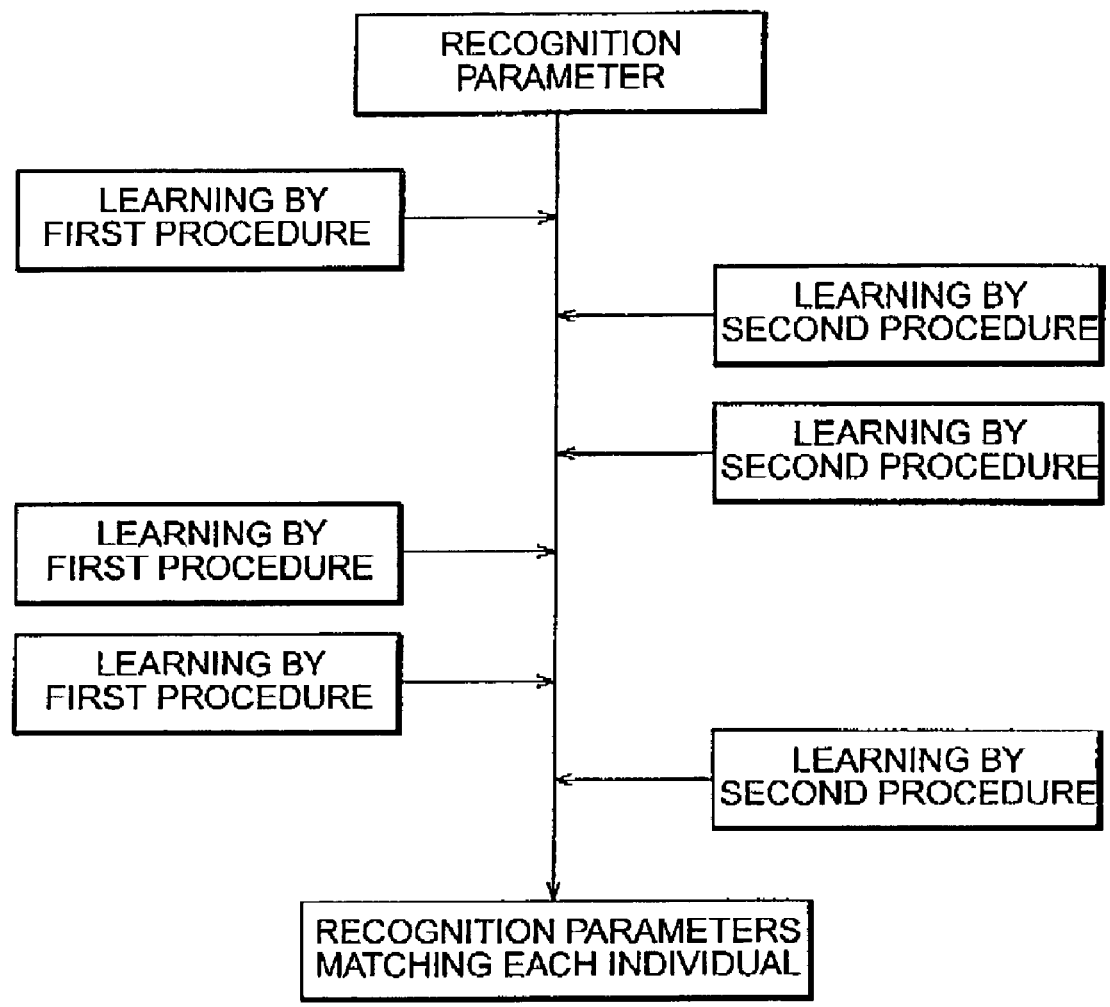
FIG. 8 is a flow chart depicting the procedure for recognition parameters to be improved by learning.

General recognition parameters are stored for any user in the mobile communication terminal 27 so as to make the recognition of local utterance content by myo-electric signals possible in the mobile communication terminal 27 without executing learning. However as FIG. 8 shows, by repeating learning based on the first procedure and learning based on the second procedure in an arbitrary sequence, the recognition parameters of the mobile communication terminal 27 are optimized for each user who uses the mobile communication terminal 27, and the recognition of the utterance content in the mobile communication terminal 27 can be performed in the mobile communication terminal 27 of each user at a high recognition rate by using these optimized recognition parameters.

The present invention is not limited to the above embodiments, but can take various modified forms.

For example, in the first procedure, the myo-electric information learning means 26 of the data center 28 learns the utterance patterns generated by the utterance pattern generation means 20 as teacher data, but when the user generates utterance patterns with voice, the voice content information recognized by the sound information recognition means 25 may be used as teacher data, or both the utterance pattern and the voice content information may be used as teacher data.

The above mentioned information recognition system 100 recognizes the utterance content based on the myo-electric information with the mobile communication terminal 27, but the present invention is not limited to this, but an image of the movement of the mouth and tongue of the user may be acquired, and be image-processed by the mobile communication terminal 27 so as to recognize the utterance content. The point here is that utterance content is recognized by the mobile communication terminal 27 based on the information on the movement of the articulation organs, and learning at the data center 28 is learning corresponding to the recognition method of the utterance content in the mobile communication terminal 27.

The information recognition system 100 comprises the sound information recognition means 25 and the utterance pattern generation means 20 as the teacher data acquisition means 33, but if the requirement for the accuracy of learning is not very demanding, then the information recognition system 100 may comprise only one of these.

As mentioned above, according to the learning device, mobile communication terminal, information recognition system and learning method, information on the movement of the articulation organs is transmitted to the learning device, and learning with a high computation load to generate recognition parameters required for recognizing the utterance content based on the information on the movement of the articulation organs is performed not by the mobile communication terminal but by the learning device. By this, compared with the case when learning is performed by a mobile communication terminal, which has a higher restriction in processing speed and memory than a stationary type computer, learning can be executed efficiently in a short time. The recognition parameters matching the user acquired by the learning device are transmitted to the mobile communication terminal, and hereafter utterance content can be recognized at a high recognition rate using these recognition parameters only by the mobile communication terminal, without the mobile communication terminal transmitting/receiving information with the learning device.

By this, the utterance content of soundless speech in particular can be appropriately performed in a mobile communication terminal, such as a portable telephone used outdoors or inside a train, based on the information on the articulation organs.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No. 2002-42072 filed on Feb. 19, 2002 and No. 2003-37064 filed on Feb. 14, 2003 are hereby incorporated by reference.

What is claimed is:

1. A learning device constituting an information recognition system along with a mobile communication terminal inter-communicable via a network, in which content of an utterance is recognized based on information on a movement of articulation organs when a user of the mobile communication terminal performs utterance action, the learning device comprising:
   an articulation organ information reception mechanism configured to receive information via the network on movement of the articulation organs which is transmitted from the mobile communication terminal;
   a teacher data acquisition mechanism that acquires teacher data corresponding to the utterance action of the user;
   a learning mechanism configured to execute learning on the recognition of the content of the utterance concerning the utterance action and generating recognition parameters based on the information on the movement of the articulation organs and said teacher data; and
   a recognition parameter transmission mechanism configured to said recognition parameters to the mobile communication terminal via the network.

2. The learning device according to claim 1, further comprising a recognition parameter data base for storing the recognition parameters generated by said learning mechanism for each user, wherein said learning mechanism refers to the recognition parameters generated in the past for the user when the recognition parameters are generated by said learning.

3. The learning device according to claim 1, wherein said teacher data acquisition mechanism comprises an utterance pattern generation mechanism configured to generate utterance patterns for the user to speak as teacher data, and said recognition parameter transmission mechanism transmits said utterance patterns to the mobile communication terminal via the network.

4. The learning device according to claim 3, further comprising a personal information data base where personal information on the user is stored corresponding to the user, wherein said utterance pattern generation mechanism generates said utterance patterns based on the personal information on the user.

5. The learning device according to claim 1, wherein said articulation organ information reception mechanism further receives information on sound at the utterance action which is transmitted from the mobile communication terminal, and said teacher data acquisition mechanism comprises sound information recognition mechanism for performing voice recognition and acquiring teacher data corresponding to the utterance action based on the information on sound.

6. The learning device of claim 1, wherein the information on movement of the articulation organs comprises information gathered from contract sensors on the mobile communication terminal that are configured to contact the user.

7. A mobile communication terminal constituting an information recognition system, along with a learning device inter-communicable via a network, in which a content of an utterance is recognized based on information on the movement of the articulation organs of the user when the user performs utterance action, the mobile communication terminal comprising:
  an articulation organ information acquisition mechanism configured to acquire information on a movement of the articulation organs of the user when the user performs utterance action;
  an articulation organ information transmission mechanism configured to transmit the information on the movement of the articulation organs to the learning device;
  a recognition parameter reception mechanism configured to receive recognition parameters on the recognition of the content of the utterance which are transmitted from the learning device; and
  an information recognition mechanism configured to recognize the content of the utterance action based on information on the movement of the articulation organs and said recognition parameters.

8. The mobile communication terminal according to claim 7, wherein said recognition parameter reception mechanism further receives the utterance patterns which are transmitted from the learning device, and the mobile communication terminal further comprises an utterance pattern presentation mechanism that presents said utterance patterns to the user.

9. The mobile communication terminal according to claim 7, further comprising a sound acquisition mechanism configured to acquire information on sound which is generated when the utterance action is performed, and said articulation organ information transmission mechanism further transmits the information on sound to the learning device.

10. The mobile communication terminal of claim 7, wherein the articulation organ information acquisition mechanism includes contact sensors configured to contact the user.

11. An information recognition system which includes a mobile communication terminal and a learning device which can communicate with said mobile communication terminal via a network, and recognizes the content of an utterance based on information on a movement of articulation organs of a user of the mobile communication terminal when the user performs utterance action,
  said mobile communication terminal further comprises:
    an articulation organ information acquisition mechanism configured to acquire information on the movement of the articulation organs of the user when the user performs utterance action;
    an articulation organ information transmission mechanism configured to transmit information on the movement of the articulation organs to said learning device;
    a recognition parameter reception mechanism configured to receive recognition parameters on the recognition of the content of the utterance which are transmitted from said learning device; and
    an information recognition mechanism configured to recognize the content of the utterance concerning the utterance action based on the information on the movement of the articulation organs and said recognition parameters, wherein
  said learning device including,
    an articulation organ information reception mechanism configured to receive the information on the movement of the articulation organs which is transmitted from said mobile communication terminal;
    a teacher data acquisition mechanism configured to acquire teacher data corresponding to the utterance action of the user;
    a learning configured to perform learning on the recognition of the content of the utterance concerning the utterance action and generating recognition parameters based on the information on the movement of the articulation organs and said teacher data; and
    a recognition parameter transmission mechanism configured to transmit said recognition parameters to said mobile communication terminal.

12. The system of claim 11, wherein the articulation organ information acquisition mechanism includes contact sensors configured to contact the user.

13. A learning method in an information recognition system which includes a mobile communication terminal and a learning device which can communicate with the mobile communication terminal via a network, and which recognizes the content of an utterance based on the information on the movement of articulation organs of a user of the mobile communication terminal when the user performs utterance action, said learning method comprising:
  an articulation organ information acquisition step where the mobile communication terminal acquires information on the movement of the articulation organs of the user when the user performs utterance action;
  an articulation organ information transmission step where the mobile communication terminal transmits the information on the movement of the articulation organs to the learning device;
  an articulation organ information reception step where the learning device receives the information on the movement of the articulation organs which is transmitted from the mobile communication terminal;
  a teacher data acquisition step where the learning device acquires teacher data corresponding to the utterance action of the user;
  a learning step where the learning device performs learning on the recognition of the content of the utterance concerning the utterance action and generating the recognition parameters based on the information on the movement of the articulation organs and said teacher data;
  a recognition parameter transmission step where the learning device transmits said recognition parameters to the mobile communication terminal; and
  a recognition parameter reception step where the mobile communication terminal receives the recognition parameters which are transmitted from the learning device.

14. The method of claim 13, wherein the articulation organ information acquisition step includes acquiring the information via contact sensors configured to contact the user.

15. A learning method in a learning device constituting an information recognition system for recognizing the content of an utterance based on information on the movement of articulation organs when a user of a mobile communication terminal performs utterance action, comprising:

an articulation organ information reception step for receiving information on the movement of the articulation organs which is transmitted from the mobile communication terminal;

a teacher data acquisition step for acquiring teacher data corresponding to the utterance action of the user;

a learning step for executing learning on the recognition of the content of the utterance concerning the utterance action and generating recognition parameters based on the information on the movement of the articulation organs and said teacher data; and a recognition parameter transmission step for transmitting said recognition parameters to the mobile communication terminal.

16. The learning method according to claim 15, further comprising a recognition parameter storing step for storing the recognition parameters generated by said learning step for each user, wherein, in said learning step, the recognition parameters generated in the past for the user is referred to when the recognition parameters are generated by said learning.

17. The learning method according to claim 15, wherein said teacher data acquisition step comprises:

an utterance pattern generation step for generating utterance patterns for the user to speak as teacher data; and an utterance pattern transmission step for transmitting said utterance patterns to the mobile communication terminal.

18. The learning method according to claim 17, further comprising a personal information storing step for storing personal information on the user corresponding to the user, wherein said utterance pattern generation step generates said utterance patterns based on the personal information on the user.

19. The learning method according to claim 15, wherein in said articulation organ information reception step, the information on sound at the utterance action which is transmitted from the mobile communication terminal is received, and in said teacher data acquisition step, voice recognition is performed based on the information on sound and the teacher data corresponding to the utterance action is acquired.

20. The method of claim 15, wherein the reception step includes receiving the information collected from contact sensors on the mobile communication terminal that are configured to contact the user.

* * * * *